United States Patent [19]

Hume, Jr.

[11] 3,859,638

[45] Jan. 7, 1975

[54] NON-VOLATILE MEMORY UNIT WITH AUTOMATIC STANDBY POWER SUPPLY

[75] Inventor: Alfred S. Hume, Jr., Sunnyvale, Calif.

[73] Assignee: Intersil Incorporated, Cupertino, Calif.

[22] Filed: May 31, 1973

[21] Appl. No.: 365,624

[52] U.S. Cl. ........................ 340/173 R, 340/173 CP

[51] Int. Cl. ........................ G11c 5/00

[58] Field of Search .................. 340/173 R, 173 CP

[56] References Cited

UNITED STATES PATENTS

| | | | |
|---|---|---|---|
| 2,358,796 | 9/1944 | Edgerton | 320/1 X |
| 3,511,933 | 5/1970 | Holmes | 179/90 B |
| 3,771,148 | 11/1973 | Aneshansley | 340/173 R |

OTHER PUBLICATIONS

Anderson et al., Volatile Memory Data Retention, IBM Technical Disclosure Bulletin, Vol. 14, No. 9, 2/72, pp. 2712–2713, S2756 0086.

*Primary Examiner*—Stuart N. Hecker
*Attorney, Agent, or Firm*—Gregg, Hendricson & Caplan

[57] ABSTRACT

An integrated circuit memory unit having an integral standby power supply actuated manually or automatically upon main power supply failure or disconnect to maintain all memory information for retrieval or use. A single integral memory unit and standby power supply effects memory retention despite main power disconnect.

3 Claims, 2 Drawing Figures

Patented Jan. 7, 1975 3,859,638

NON-VOLATILE MEMORY UNIT WITH AUTOMATIC STANDBY POWER SUPPLY

BACKGROUND OF INVENTION

Integrated circuit memory units such as ROMs, RAMs, and the like, require power for operation thereof and, furthermore, require power for maintenance or retention of information stored therein.

Considering first the circumstance wherein an integrated circuit memory unit is unavoidably disconnected from a main power supply, it is noted that unavoidable leakage internally of the unit may cause a change of state of one or more elements of the unit so that the stored information then is changed and becomes wholly unreliable. It is normally considered that any uncompensated power failure causes information stored in an IC memory to be wholly unreliable. This is readily understood when it is considered that any one bit of information may change and even if but a single bit changes, it is unknown which one is changed so that all stored information may then be wholly unusable or unreliable. In this same respect it is noted that, even aside from the probability of leakage of charges within an IC memory, the disconnection of the power supply thereto may cause transients which could change the state of one or more elements of the memory so that the total stored information is wholly unusable. It is normally considered that power failure for even a small fraction of a second results in total loss of memory of an IC memory unit.

It is conventional for electronic memory units to be provided with auxiliary power supplies and switching means and commonly such auxiliary power supplies incorporate engine-driven generators or the like such that failure of public utility power does not result in failure of power supplied to the memory unit. Such elaborate precautions to preclude loss of stored information is understandably costly but to date has been unavoidably necessary for regeneration of stored information is normally even more costly and time-consuming. In addition to the possible unintentional loss of power to an IC memory unit, there is also a desired function of unplugging an IC memory unit from a read-write unit, for example, and physically replugging such a memory unit into other apparatus. This situation may, for example, arise in connection with aircraft or the like wherein it is desired to store information in a memory unit at a computer center or the like and then to apply this information to some location or mechanism requiring the information for comparison and/or utilization. This physically movable memory capability is normally not available without extensive equipment.

There is provided by the present invention single memory boards or units which may be of very limited physical size which have the capability of retaining all stored information despite uncoupling of the unit from a normal power supply.

SUMMARY OF INVENTION

The present invention provides a memory which is not volatile, i.e., does not change state upon removal or failure of power normally applied thereto. The invention includes an integrated circuit memory unit which may have the normal capabilities of read and write (RAM) or read only (ROM) with connection to conventional power supply means. The memory unit hereof is packaged with an "on plane" battery of low power and includes switching means for disconnecting the memory unit from all substantial power requirements while at the same time connecting the battery thereto for maintenance of required electric conditions for retaining stored information for subsequent retrieval.

The unit of the present invention incorporates automatic switching means for switching the circuit to self-contained battery operation at low power so that stored information is retained for a period up to one year. The unit may also include manual switching means for the retention of stored information during intentional power disconnection until reconnection of the memory unit to a normal power supply at another location, for example.

The present invention provides for overcoming prior art difficulties resulting from main power failure to circuitry including integrated circuit memory units. Heretofore it has been necessary to incorporate standby electrical generation means having substantially the same capability as main power supply means, together with means for maintaining upon the main power supply lines a full electrical energization in order to prevent any possible loss of stored information or data upon main power supply failure. Additionally, it has heretofore been either impossible or extremely difficult to provide for the physical movement from one location to another of small units containing stored information.

Specifically the present invention incorporates, upon what may be termed a memory plane, both an IC memory and a small battery power supply with the plane being adapted for connection to a main power supply. A "power down" detector included in the IC memory unit on the memory plane determines or detects any low voltage or low power condition of the main power supply and automatically switches the battery into connection with certain terminals of the array for maintaining satisfactory conditions at the array so that no stored information can be lost. It is also herein provided that the unit of the present invention may be operated either as a read-write or read only memory and additionally provides for deletion of the write function in the low power or standby condition wherein the on plane battery provides standby power for the memory unit. Only sufficient power is provided to the memory unit herein by the on plane battery to prevent loss of memory or stored information such that this information may then subsequently be retrieved without fear of error therein even though main power has been removed intentionally or unintentionally from the memory unit.

The non-volatile memory of the present invention is comprised as an integral unit incorporating the battery, power down detector and switches operated by the latter so that the user is in no way concerned with the internal operation of the invention but only realizes the advantages thereof. The on plane battery of the present invention is adapted to be recharged by the main power supply connection of the unit and normally provides information retention without loss of credibility for a period of approximately one year.

DESCRIPTION OF FIGURES

The present invention is illustrated as to a preferred embodiment thereof in the accompanying drawings wherein.

DESCRIPTION OF PREFERRED EMBODIMENT

Figure 1:
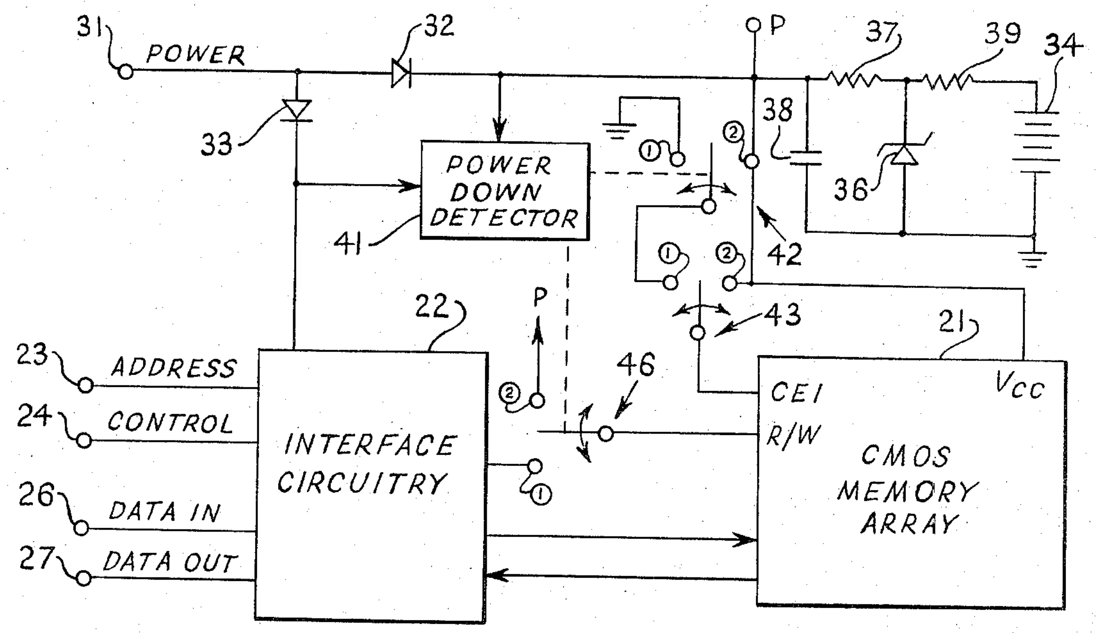
FIG. 1 is a schematic circuit diagram of a memory unit incorporating the present invention.

There is schematically illustrated in FIG. 1 of the drawings circuitry adapted to be provided as a single packaged unit including an integrated circuit CMOS memory array 21 connected through interface circuitry 22 to an address terminal 23, a control terminal 24, a data in terminal 26 and a data out terminal 27. A power supply terminal 31 is connected through a first diode 32 to $V_{CC}$ of the memory array 21 and through a second diode 33 to the interface circuitry 22.

On the plane of the memory unit there is provided a battery 34 for the purpose of providing standby power to the memory array 21 under conditions wherein power is removed from the input terminal 31. A Zener diode 36 is connected through resistor 39 to one side of the battery 34 and directly to the other grounded side of the battery. A resistor 37 is connected from the Zener-resistor 39 juncture to $V_{CC}$ of the memory array 21. A capacitor 38 is connected from the resistor 37 to ground. It will be seen that the battery 34 is normally charged from the power supply terminal 31 through the diode 32 and resistor 39 and this battery is provided as a miniaturized rechargeable type having a long life at low power drain.

The present invention provides for isolating the memory array 21 under conditions wherein main power is removed therefrom. It will be appreciated that a certain amount of power is consumed by the memory array 21 during various operations thereof such as reading information into the array and writing information out of the array. Such power is normally provided by an external power supply connected to terminal 31 of the unit. Any termination or substantial reduction of input power to the unit raises the possibility of a change of state of one or more bits in the memory array so that the stored information is no longer reliable nor usable. Thus a power failure resulting in substantial or total loss of power to the unit must be considered as destructive of the information stored in the memory array. The present invention operates to prevent information loss under these circumstances. Additionally, it is desirable under certain circumstances to be able to disconnect a memory unit from its normal location and physically move it to some other location where it can be plugged in and the stored information employed. Unplugging the memory array produces the same result as a power failure and thus is not generally practical. The present invention provides for automatically preserving all stored information under circumstances wherein the memory unit is intentionally removed from connection to main power.

There is provided on the memory plane of the present invention a "power down" detector 41 connected to the power supply terminal 31 and to the battery 34 for detecting a reduction in input power below a predetermined level. In practice this power down detector may be comprised as a voltage detector with the threshhold thereof being set in accordance with the particular memory array and interface circuitry employed. The detector 41 is connected to operate a switch 42 having switch positions 1 and 2 and the power down detector normally holds the switch arm in grounded position 1. There is also provided a second switch 43 having switch terminals 1 and 2, with the first terminal connected to the switch arm of switch 42 and the terminal 2 connected to the battery 34. In normal operating conditions the circuit switch 43 is maintained in position 1 and the switch arm thereof is connected to a disable terminal CE1 of the memory array 21 so that this terminal is not energized.

The switches 42 and 43 are connected together with the switch arms thereof normally engaging terminals 1 of each of the switches so that terminal CE1 of the memory array is grounded. Manual operation of switch 43 to move the switch arm into contact with terminal 2 thereof applies battery voltage to terminal CE1 of the memory array to thereby disable internal input-output circuitry of the array and cut off power consumption circuitry thereof. Similarly, detection of a low voltage at input terminal 31 by the detector 41 actuates switch 42 to move the switch arm to terminal 2 and thus apply battery voltage through switch 42 and switch 43 to terminal CE1 of the memory array to produce the same result.

There is additionally provided herein a third switch 46 connected between the interface circuitry 22 and a read-write terminal R/W of the memory array 21. This switch 46 has a switch arm connected to terminal R/W and movable between a first switch terminal 1 connected to the interface circuitry and a second switch terminal 2 connected to the battery 34. This connection is illustrated in the drawing by the letter P appearing both at the battery output and at terminal 2 of switch 46. Switch 46 has the switch arm thereof normally engaging terminal 1 of the switch so as to interconnect the interface circuitry and the read-write terminal of the memory array. However, upon power failure, as determined by detector 41, the switch 46 will be operated to move the switch arm to terminal 2 for applying battery voltage to the read-write terminal of the memory array. This switch 46 then changes the memory unit from a read-write unit to a read only unit.

Figure 2:
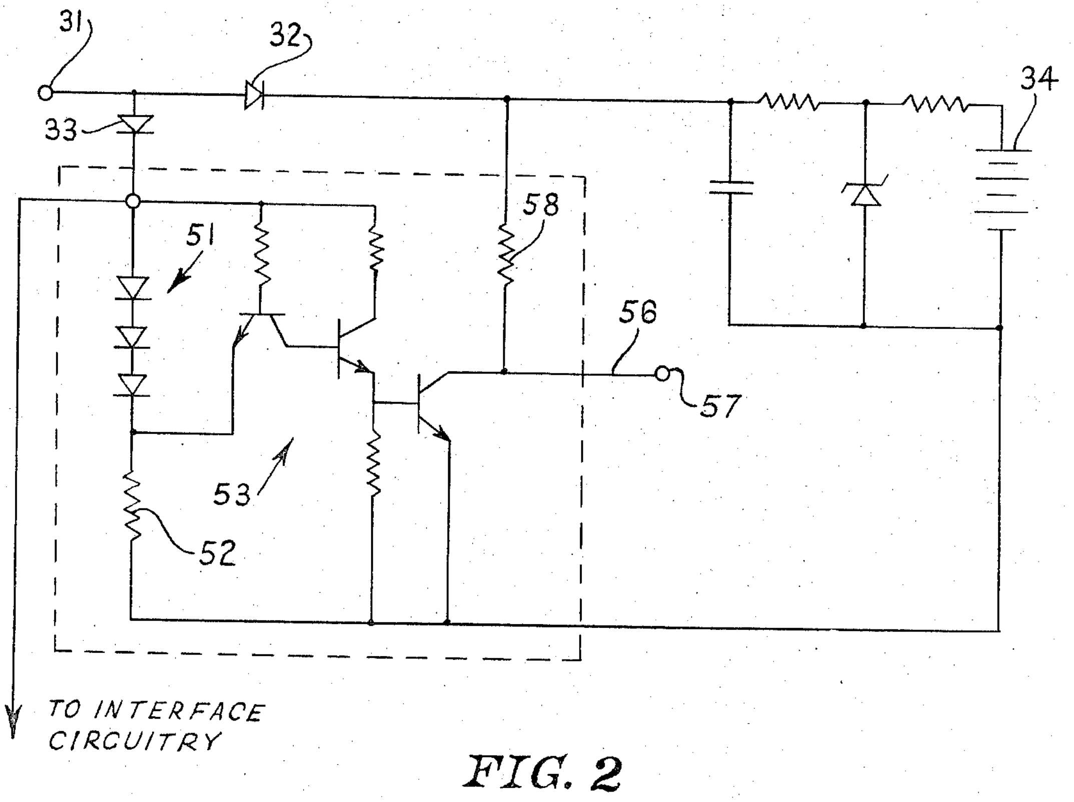
FIG. 2 is a circuit diagram of a power down detector as may be employed in the circuit of FIG. 1.

The detector of the present invention may be comprised in a variety of ways and there is illustrated in FIG. 2 of the drawing one possible power down detector circuit connected to the battery circuit of FIG. 1. The power supply terminal 31 will be seen to be connected through diode 33 to a voltage level adjustment comprising a plurality of serially connected diodes 51 connected in series with a resistor 52 to ground or a return line to negative battery. A TTL gate 53 is connected between the power supply and ground with the input thereto being provided by the voltage developed across the series of diodes 51. This TTL gate is shown to comprise three transistors and three resistors connected in conventional manner to form a hex inverter and having an output line 56 connected to a terminal 57 and through a resistor 58 to battery.

The detector operates upon some threshhold voltage as, for example, of the order of 1.5 volts for a power supply of 5 volts to maintain the output transistor of the gate conducting so as to tie terminal 57 to ground. Reduction of power supply voltage sufficient to reduce the input signal to the gate 53 below threshhold causes the gate to reverse states and produce an output logic "1", i.e., cut off the output transistor of the gate, so that terminal 57 is then raised to battery voltage. The terminal 57 may, for example, be connected to a transistor switch comprising switch 42 of the circuit of FIG. 1. Alternatively, terminal 57 may be connected through the manual switch 43 to the disable terminal CE1 of the memory array 21 inasmuch as the power down circuit of FIG. 2 performs the switching function of switch 42. The return of power supply voltage to an acceptable level again reverses the state of TTL gate 53 so as to ground terminal 57 and return the memory array 21 to normal operation. It is also noted that terminal 57 may be connected to a transistor switch comprising switch 46 of FIG. 1 in order to control the read-write function of the memory array for power loss as described above.

The memory array of the present invention consumes power by junction leakage, by switching, by ratio stages in the array even without address changing. The present invention provides for terminating power consumption by switching, i.e., address changing, as well as terminating power consumption in ratio stages of the array when the input power is reduced, and furthermore provides sufficient standby power to the array for maintaining the integrity of information stored therein. In actuality the power drain of the memory array 21 with battery voltage applied to CE1 and R/W terminals thereof is extremely small. The battery 34 may, for example, comprise a conventional electronic watch battery and yet maintain the memory array information for approximately one year without fear of any possible degradation of the information stored therein. The present invention is particularly applicable to situations wherein it is desired to insert information in a memory array at one location and then to physically move the memory unit to another location as, for example, in connection with aircraft or the like. Commonly the second location is one at which the information is only read out of the array, although, of course, it is possible at a second location to either read or write information into or out of the memory if full power is there applied to the unit.

The present invention is herein illustrated and described with switches having physically movable switch arms; however, it will be appreciated that semiconductor switches are commonly employed, particularly as regards the detector operated switches. Similarly the power down detector may be comprised as a voltage sensitive semiconductor unit changing state upon reduction of applied power below a predetermined level and applying such change of state to semiconductor switches 42 and 46 to operate them.

Although the present invention has been described with respect to a single preferred embodiment thereof, it will be appreciated by those skilled in the art that various modifications are possible within the scope of the present invention and thus it is not intended to limit the invention to the precise details of illustration or description.

What is claimed is:

1. An improved integrated circuit memory having interface circuitry connecting address and data in and data out terminals to a memory array with a power supply terminal connected to the interface circuitry and memory array and comprising a small battery connected to $V_{CC}$ of the memory array, a detector connected to the power supply terminal and detecting a reduction in power at said terminal below a predetermined level, and switching means operated by said detector for connecting said battery to a disable terminal and a read-write terminal of said memory array to minimize power consumption by said memory array whereby said battery maintains the integrity of information stored in said array during reduced or failure of power at said power supply terminal.

2. The memory of claim 1 further defined by all of said elements being disposed upon or within a single planar semiconducting chip and contained within a single package except for terminals exposed for connection.

3. The memory of claim 1 further defined by a manually operable switch connected between said battery and said disable terminal and read-write terminal of the array for manual switching to maintain the integrity of stored information prior to intentional disconnection of the memory from a power supply.

* * * * *